April 14, 1970  G. A. TINNERMAN  3,505,922
MOUNTING FASTENER
Filed Feb. 27, 1968
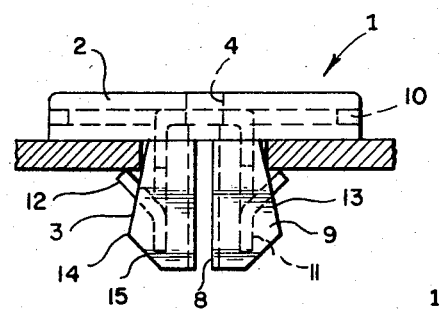
FIG. 1
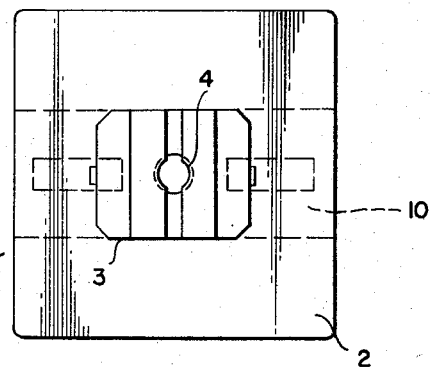
FIG. 2
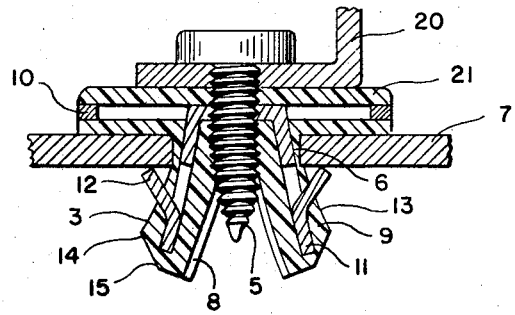
FIG. 3
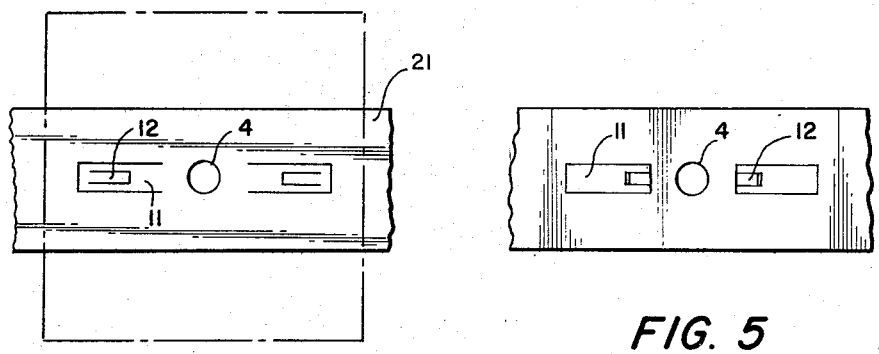
FIG. 4
FIG. 5
INVENTOR
GEORGE A. TINNERMAN
BY Revere B. Curley
ATTORNEY

United States Patent Office 3,505,922
Patented Apr. 14, 1970

3,505,922
MOUNTING FASTENER
George A. Tinnerman, 17864 Beach Road,
Lakewood, Ohio 44107
Filed Feb. 27, 1968, Ser. No. 708,604
Int. Cl. F16b 13/06
U.S. Cl. 85—83                           2 Claims

ABSTRACT OF THE DISCLOSURE

A composite fastener of plastic material and metal has a head and stem structure with an aperture therethrough the stem structure being expandable upon insertion in an opening in a base and retained therein by a shank threaded into the aperture. The head and stem structure have a metal insert embedded therein, metal elements in the stem structure having projections which are held expanded by the shank to retain the fastener in the opening in the base.

NATURE OF INVENTION

This invention resides in a composite fastener of plastic material and metal which is inserted in an opening in a base and forms a fixed nut or anchor for a stud or shank which is threaded into the fastener. The fastener is inserted in the opening in the base from the same side as the stud, and is expanded in the opening to prevent withdrawal, in the manner of expansion or "blind" fasteners. Applicant's prior Patent No. 3,082,807 discloses a fastener of this type, and this invention may be considered to be a modification of that construction.

It is an object of this invention to provide such a fastener which will be securely held in the base when the shank or stud is inserted in the fastener. It is a further object of this invention to provide a composite fastener of this type which will combine the advantages of plastic material with the positive action of a metal component.

In the drawings:

FIGURE 1 is a side elevation of the fastener mounted in an opening in a base.

FIGURE 2 is a bottom plan view of the fastener of FIGURE 1.

FIGURE 3 is an axial cross section through the fastener in use to secure a member to the base.

FIGURES 4 and 5 are plan views illustrating the manufacture of the metal element of the fastener.

DESCRIPTION

The fastener element 1 has a head 2 and a flexible, expandable stem structure 3. An aperture or passage 4 extends through the head 2 and stem structure 3 to receive a shank 5 threaded in the aperture 4. The stem structure 3 extending from one side of the head may be expanded laterally to be fixed in the opening 6 in the base member 7. This stem structure 3 is formed of plastic integral with the plastic head and has a passage in line with the aperture 4 in the head but of smaller diameter to receive the shank 5 passing through the aperture 4. Longitudinal slits 8 in the stem structure allow the stem structure to be expanded laterally, forming in effect a plurality of legs 9 spaced by the slits 8.

The composite fastener is made of plastic and metal, the head of plastic having a metal head 10 embedded therein, the aperture 4 passing through the metal head 10. The stem structure 3 has integral metal leg elements 11 extending from the metal head 10 and embedded in the plastic material on the sides of the passage through the stem structure. An integral projection 12 on each metal leg element 11 extends outwardly to or beyond the surface of the plastic of the stem structure 3, and these elements diverge toward the head and are slightly spaced from it, so the stem structure may be pressed through opening 6 in the base 7. Insertion of the shank 5 may expand the stem structure and metal leg elements 11, so the projections 12 underlie the base. The metal leg elements 11 with the projections 12 constitute the principal securing means for the fastener.

The stem structure 3 may be formed with the surfaces 13 diverging from the head to a point of maximum width at 14, so that the plastic stem structure when expanded is wider than the opening 6 in base 7. The converging surfaces 15 on the end of the stem structure produce contraction of the stem structure when pressed in opening 6, the stem structure expanding after it is forced through the opening. The shank 5 holds the stem structure expanded.

The shank 5 used in this illustration of the invention is threaded and threads into the aperture of the metal head element 10 to secure a member 20 to the base 7. As shown in FIGURE 3, this threaded shank will expand the stem structure and cause the projections 12 to engage the base member 7 and prevent withdrawal of the fastener. It will be obvious that other forms of threaded engagements may be used. For example, the aperture in the metal head portion may be formed as a thread cutting nut, in the form shown in application of Tinnerman, Ser. No. 640,213, filed May 22, 1967. A smooth stud threaded through the thread cutting aperture will provide the threaded engagement to advance the shank, which will enter the passage and expand the stem structure.

In FIGURES 4 and 5, the simplicity of manufacturing the metal insert is illustrated. In FIGURE 4, the strip 21 has the aperture 4 and the legs 11 with projections 12 cut out in one operation. In the next operation, as shown in FIGURE 5, the legs are bent to position for embedding in the stem structure and the projections are bent outwardly. The fasteners may then be severed from the strip of material.

I claim:

1. A composite fastener for mounting in an opening in a base to receive a shank threaded therein, comprising a plastic body having a head provided with an aperture therethrough, and a flexible, expandable stem structure having a plurality of legs extending from one side of said head and spaced about said aperture, said stem structure having its greatest transverse dimension spaced from said head, the end of said stem structure having diverging surfaces sloping outwardly from said end toward the head so that the stem structure is compressed laterally when forced through said opening, a metal insert having a head and legs encased in the head and legs of said plastic body, each of said legs of said metal insert extending toward the end of the plastic leg beyond the end of the diverging surfaces on said leg and having a tongue projecting outwardly from the surface of the plastic leg between said diverging surfaces and said head, said tongues diverging toward said head portion with their ends spaced a greater distance than the width of said opening so that when said fastener element is pressed through said opening, the stem structure is compressed laterally to pass through said opening and the tongues pass through said opening and underlie said mounting member, and are hold expanded by said shank.

2. A composite fastener for mounting in an opening in a base to receive a threaded shank, comprising a plastic body having a head provided with an aperture therethrough and a stem structure having at least two legs on opposite sides of said aperture extending from said head portion and spaced transversely to allow flexing of said legs toward each other and form a passage aligned with said aperture, said legs having surfaces on the end opposite said head which diverge toward said head, a metal insert having a head encased in the head of said plastic body and provided with an aperture in alignment with the aperture in said plastic head portion, and legs encased in the legs of said plastic body extending toward the ends of the legs of said plastic body beyond the ends of said diverging surfaces on said legs, the legs of said metal insert having outwardly projecting tongues extending from the surfaces of said plastic legs between the diverging surfaces of said legs and said head and diverging toward said head, the legs of said insert and plastic body being expanded by said threaded shank to spread the ends of said tongues so they are more widely spaced transversely than the width of said opening and narrowly spaced from said head portion, the legs of said fastener when pressed through said opening being, flexed toward each other by the diverging surfaces on said plastic legs and said tongues with the tongues underlying the base when in position, said apertures in said head portions receiving the shank to spread the legs of said metal element and plastic body and maintain the tongues beyond the edge of said opening.

References Cited

UNITED STATES PATENTS

| | | | |
|---|---|---|---|
| 2,948,938 | 8/1960 | Holton. | |
| 3,082,807 | 3/1963 | Tinnerman | 85—84 |
| 3,126,039 | 3/1964 | Fiddler | 85—80 |
| 3,139,768 | 7/1964 | Biesecker | 151—41.75 |

FOREIGN PATENTS

| | | |
|---|---|---|
| 651,233 | 11/1964 | Belgium. |
| 1,464,727 | 11/1966 | France. |

MARION PARSONS, Jr., Primary Examiner

U.S. Cl. X.R.

85—84